US008300236B2

(12) United States Patent
Saitoh et al.

(10) Patent No.: US 8,300,236 B2
(45) Date of Patent: Oct. 30, 2012

(54) IMAGE FORMING SYSTEM, APPARATUS, METHOD AND COMPUTER READABLE MEDIUM FOR SELECTING PRINT REQUESTS ACCORDING TO POST-PROCESSING SPEEDS

(75) Inventors: Masato Saitoh, Ebina (JP); Takahisa Ueno, Ebina (JP); Shinichi Kinoshita, Ebina (JP); Tetsuya Neriki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 527 days.

(21) Appl. No.: 12/116,250

(22) Filed: May 7, 2008

(65) Prior Publication Data

US 2009/0097055 A1 Apr. 16, 2009

(30) Foreign Application Priority Data

Oct. 11, 2007 (JP) ................................ 2007-265098

(51) Int. Cl.
*G06K 15/00* (2006.01)

(52) U.S. Cl. ........................ 358/1.13; 358/1.1; 358/1.15

(58) Field of Classification Search ................... 358/1.1, 358/1.9, 1.13, 1.15, 400, 401, 296
See application file for complete search history.

(56) References Cited

U.S. PATENT DOCUMENTS

| | | | | |
|---|---|---|---|---|
| 7,940,412 | B2 * | 5/2011 | Matsumae et al. | 358/1.15 |
| 2006/0262342 | A1 * | 11/2006 | Kumagai et al. | 358/1.14 |
| 2008/0049251 | A1 * | 2/2008 | Shimada | 358/1.15 |
| 2008/0180742 | A1 * | 7/2008 | Koike | 358/1.15 |

FOREIGN PATENT DOCUMENTS

| | | | |
|---|---|---|---|
| JP | 2001-215858 | A | 8/2001 |
| JP | 20061044 | A | 1/2006 |
| JP | 2007139974 | A | 6/2007 |

OTHER PUBLICATIONS

Office Action dated Jun. 5, 2012 from the Japanese Patent Office in counterpart Japanese application No. 2007-265098.

* cited by examiner

*Primary Examiner* — Thomas D Lee
(74) *Attorney, Agent, or Firm* — Sughrue Mion, PLLC

(57) ABSTRACT

An image forming system includes: an image forming unit that forms an image on paper sheets, plural post-processors that execute post-processing for paper sheets on which an image has been formed by the image forming unit, a calculator that calculates a waiting period for image forming that post-processing by a post-processor in response to a first print request entails, a selector that selects out of succeeding print requests a print request that requires the use of a different post-processor from the post-processor being used for the first print request as a second print request according to the waiting period calculated by the calculator, and an image forming controller that controls the image forming unit so as to execute image forming in response to the second print request selected by the selector in the waiting period for the image forming in response to the first print request.

12 Claims, 9 Drawing Sheets

IMAGE FORMING SYSTEM, APPARATUS, METHOD AND COMPUTER READABLE MEDIUM FOR SELECTING PRINT REQUESTS ACCORDING TO POST-PROCESSING SPEEDS

CROSS-REFERENCE TO RELATED APPLICATIONS

This application is based on and claims priority under 35 USC 119 from Japanese Patent Application No. 2007-265098 filed Oct. 11, 2007.

BACKGROUND

Technical Field

The present invention relates to an image forming system, an image forming apparatus, an image forming method and a computer readable medium storing a program.

SUMMARY

According to an aspect of the invention, there is provided an image forming system including: an image forming unit that forms an image on paper sheets, plural post-processors that execute post-processing for paper sheets on which an image has been formed by the image forming unit, a calculator that calculates a waiting period for image forming that post-processing by a post-processor in response to a first print request entails, a selector that selects out of succeeding print requests a print request that requires the use of a different post-processor from the post-processor being used for the first print request as a second print request according to the waiting period calculated by the calculator, and an image forming controller that controls the image forming unit so as to execute image forming in response to the second print request selected by the selector in the waiting period for the image forming in response to the first print request.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described in detail below with reference to accompanying drawings.

First Exemplary Embodiment

Figure 1:
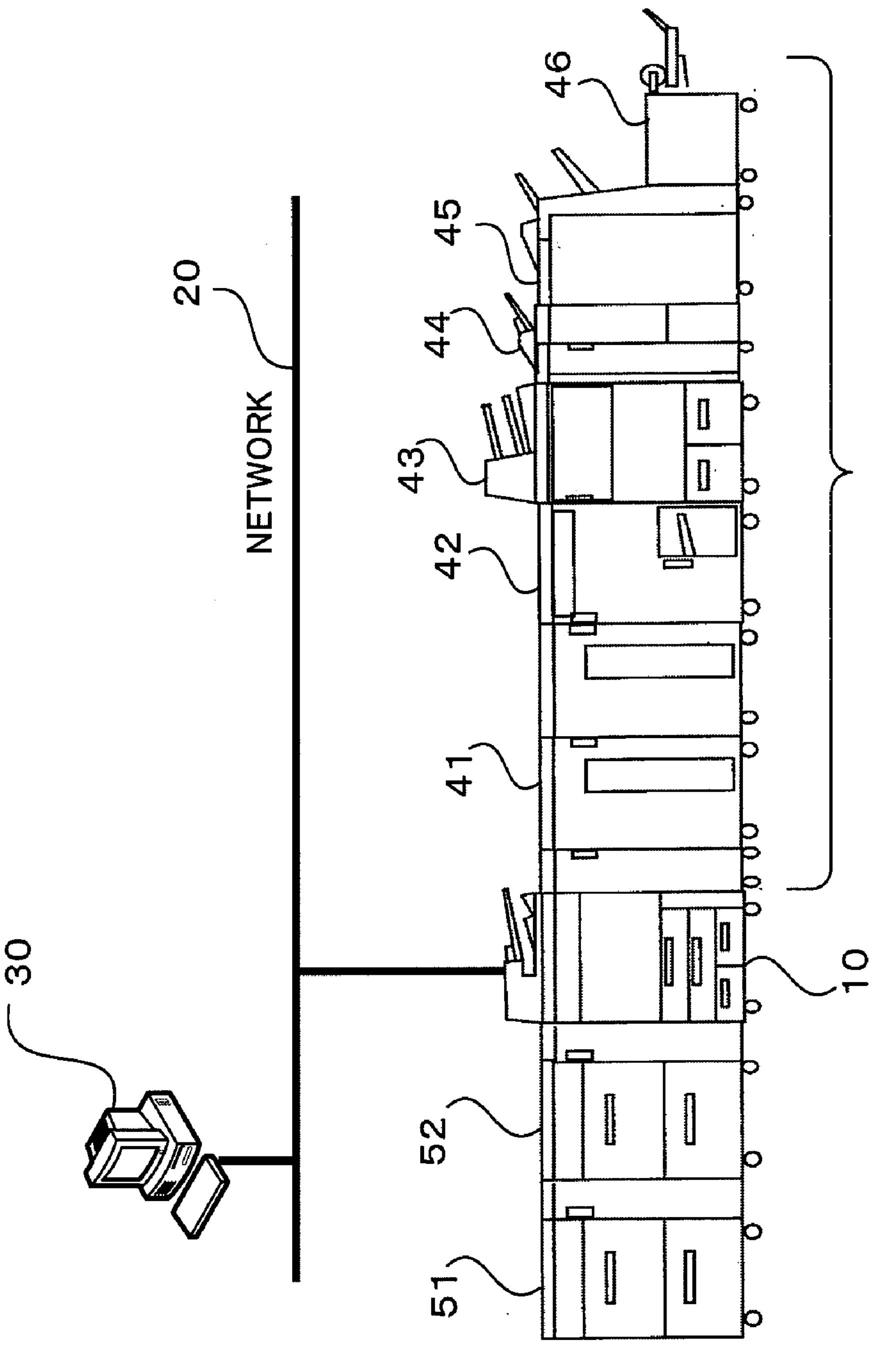
FIG. 1 shows an image forming system, which is a first exemplary embodiment of the present invention.

FIG. 1 shows an image forming system, which is a first exemplary embodiment of the invention. The image forming system of this exemplary embodiment, as shown in FIG. 1, includes an image forming apparatus 10, a sheet post-processor group 40 in which the constituent post-processors are connected in tandem to the image forming apparatus 10, sheet feeders 51 and 52, and a terminal 30. The image forming apparatus 10 and the terminal 30 are connected by a network 20. The terminal 30 generates a print job (print request) and transmits it to the image forming apparatus 10 via the network 20. The image forming apparatus 10, accepting the print job transmitted from the terminal 30, outputs onto a printing sheet an image matching the print job. The sheet post-processor group 40 includes various post-processors 41 through 46 which execute post-processing for paper sheets in various modes including pinning, punching, cutting, folding and binding on paper sheets in which images have been formed by the image forming apparatus 10.

More specifically, the sheet post-processor group 40 includes a stacker 41, a tape binder 42, a binder 43, a punch 44, a tamper 45 and a folder 46.

Next, the printing mechanism (print engine) of the image forming apparatus 10 in the image forming system of this exemplary embodiment will be described with reference to FIG. 2.

Figure 2:
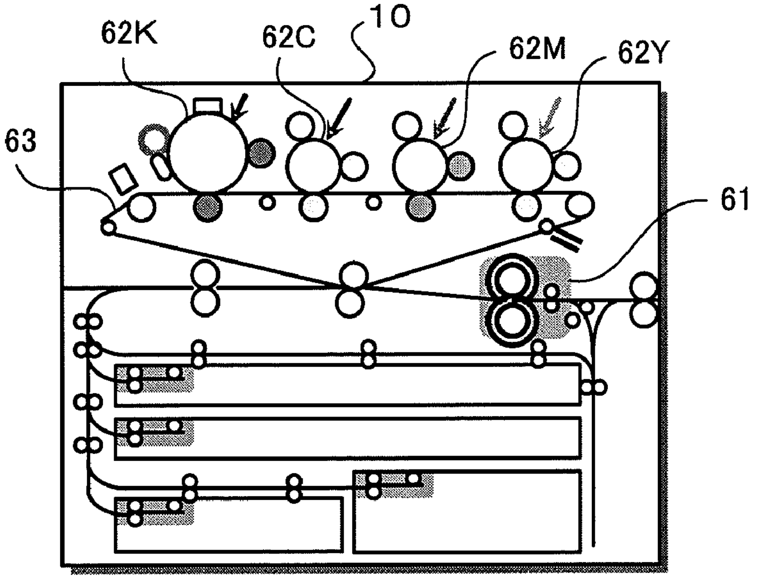
FIG. 2 shows the printing mechanism of the image forming apparatus 10 of the first exemplary embodiment of the invention.

An intermediate transfer belt 63 is arranged in the image forming apparatus 10 as shown in FIG. 2. Image forming units 62K, 62C, 62M and 62Y respectively representing colors K, C, M and Y are arranged in parallel on this intermediate transfer belt 63. Each of these image forming units 62K, 62C, 62M and 62Y is provided with a photoreceptor drum, an electrifier for electrifying this photoreceptor drum, an exposer for forming an electrostatic latent image on the photoreceptor drum, and a developing device for developing the electrostatic latent image formed by the exposer on the photoreceptor drum.

The image forming units 62K, 62C, 62M and 62Y respectively form black, cyan, magenta and yellow toner images on the intermediate transfer belt 63.

The toner images formed on the intermediate transfer belt 63 are transferred to a paper sheet that has been fed, and the passage of this sheet through a fixing device 61 causes the images to be fixed by the heat and pressure that are applied.

Figure 3A:
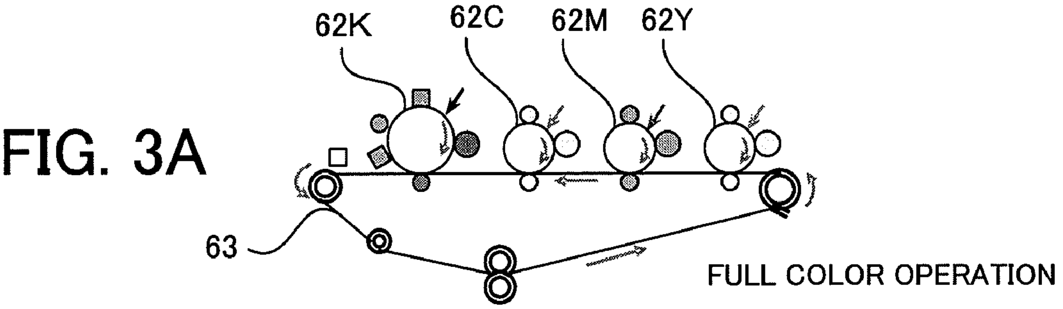
FIGS. 3A and 3B illustrate the operating states of the image forming apparatus 10 of the first exemplary embodiment of the invention in the full color mode and in the black and white mode.
Figure 3B:
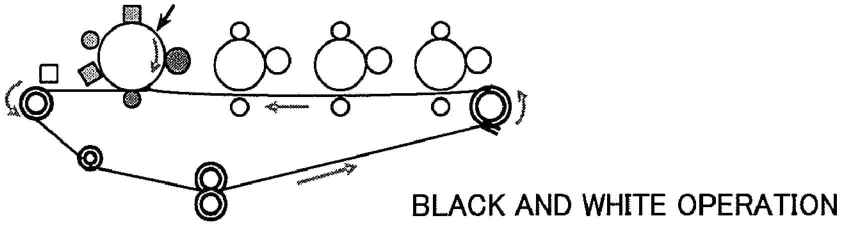

When full color operation using all the four colors K, C, M and Y is to be carried out by this image forming apparatus 10, image forming is accomplished by bringing the four image forming units 62K, 62C, 62M and 62Y into contact with the intermediate transfer belt 63 as shown in FIG. 3A. Or when black and white (monochrome) operation is to be carried out, only the image forming unit 62K comes into contact with the intermediate transfer belt 63 to accomplish image forming as shown in FIG. 3B.

Figure 4:
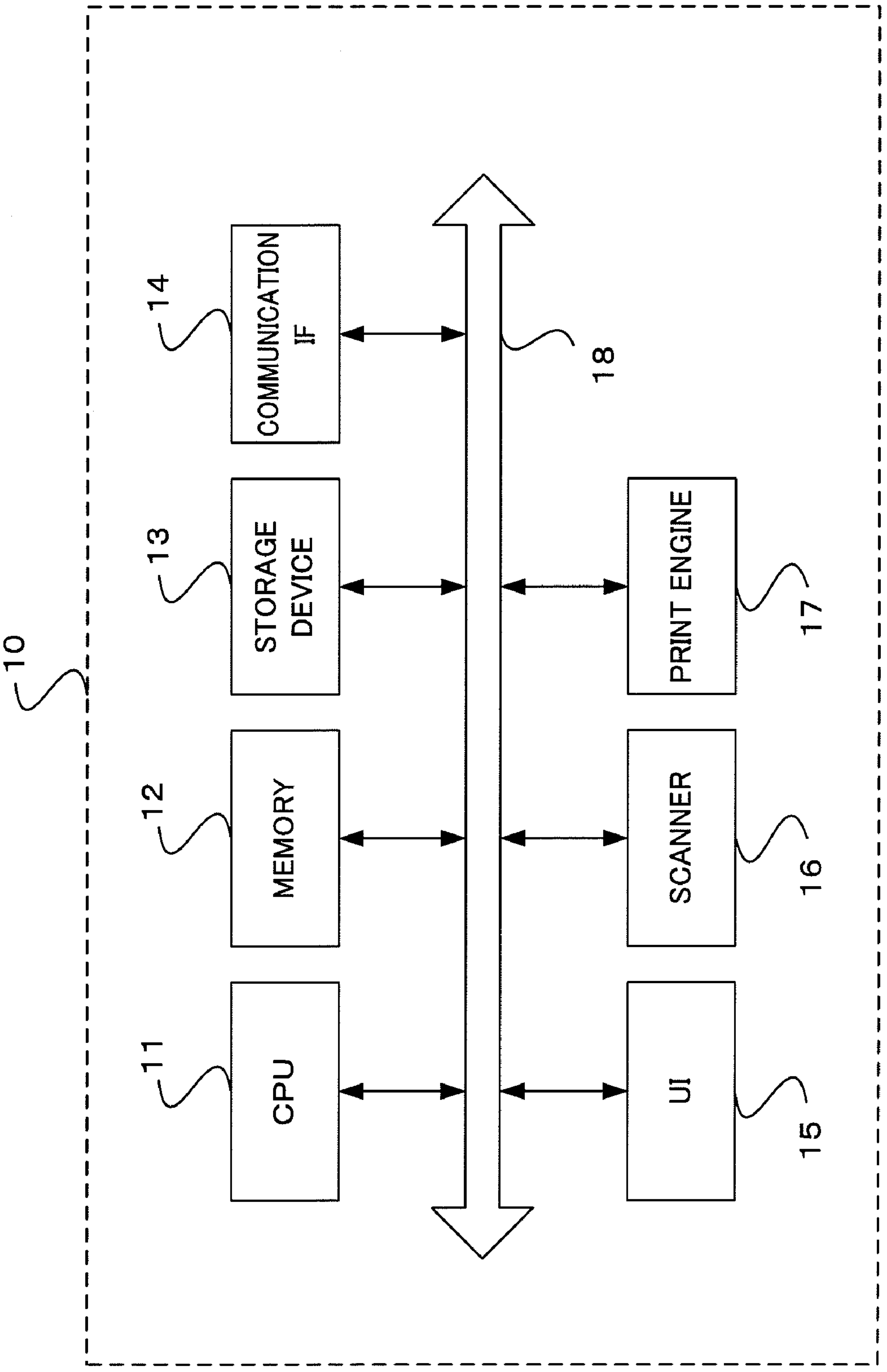
FIG. 4 is a block diagram showing the hardware configuration of the image forming apparatus 10 of the first exemplary embodiment of the invention.

Now, the hardware configuration of the image forming apparatus 10 in the image forming system of this exemplary embodiment is shown in FIG. 4.

The image forming apparatus 10, as shown in FIG. 4, has a CPU 11, a memory 12, a storage device 13 such as a hard disk drive (HDD), a user interface (UI) 15 which transmits and receives data to and from the external terminal 30 via a network, a communication interface (IF) 14 including a touch panel or a liquid crystal display and a keyboard, a scanner 16 and a print engine (printing mechanism) 17 like the one referred to above. These constituent elements are connected to one another via a control bus 18.

The CPU 11 controls the operation of the image forming apparatus 10 by executing prescribed processing in accordance with a control program stored in the memory 12 or the storage device 13.

Incidentally, though it is described above that the CPU 11 reads out the control program stored in the memory 12 or the storage device 13 and executes it in this exemplary embodiment, it is also possible to store the program in a storage medium such as a CD-ROM of the like and provide it to the CPU 11.

Figure 5:
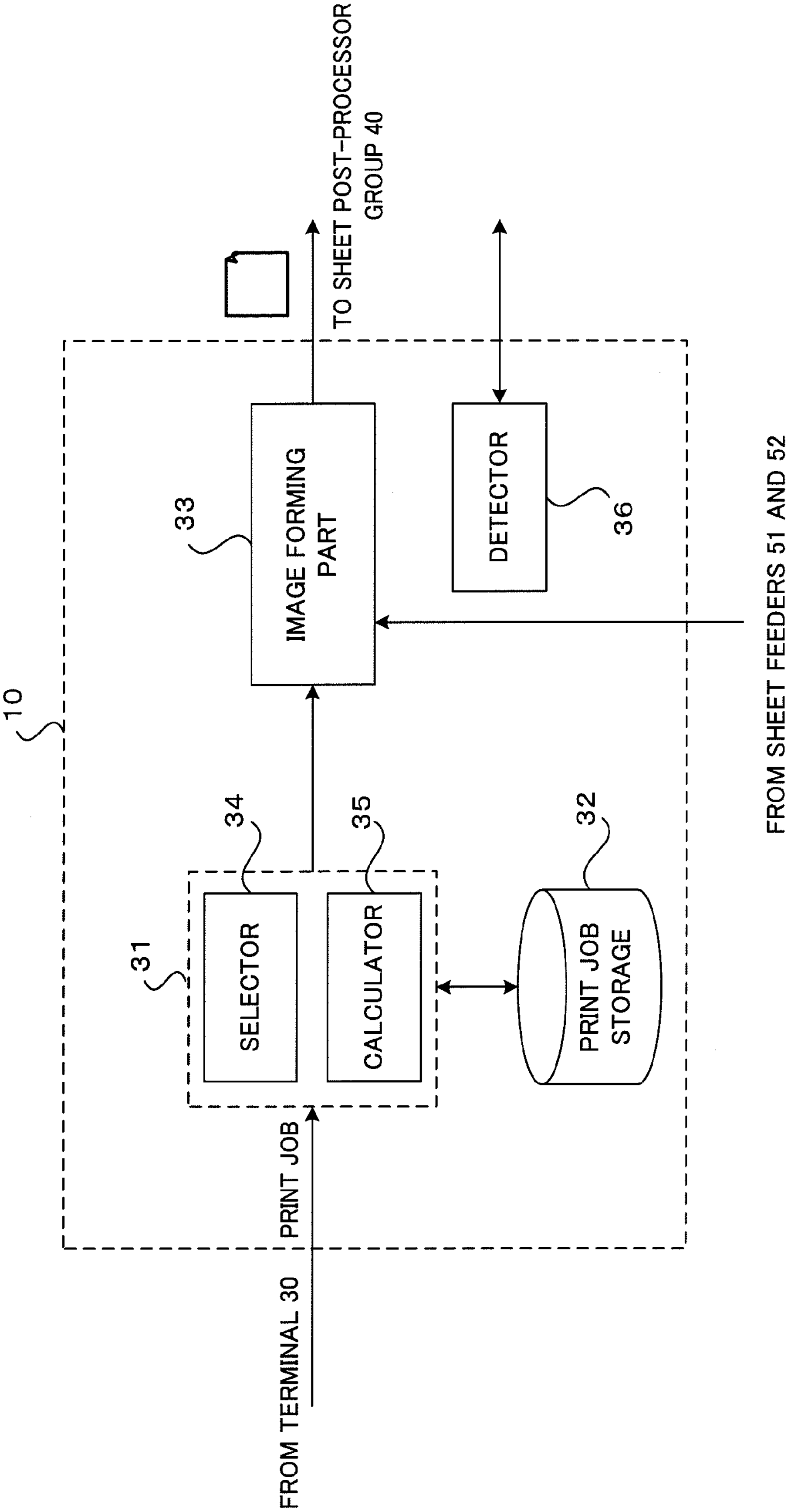
FIG. 5 is a block diagram showing the functional configuration of the image forming apparatus 10 of the first exemplary embodiment of the invention.

FIG. 5 is a block diagram showing the functional configuration of the image forming apparatus 10 realized by the execution of the control program.

The image forming apparatus 10 of this exemplary embodiment, as shown in FIG. 5, is provided with a print controller 31, a print job storage 32, an image forming part 33 and a detector 36.

The print controller 31 accepts a print job from the terminal 30, stores the accepted print job into the print job storage 32 and at the same time realizes image forming processing by controlling the image forming part 33 in accordance with the accepted print job.

The image forming part 33, configured of a printing mechanism shown in FIG. 2, processes image forming in accordance with control by the print controller 31 on a paper sheet fed by the sheet feeders 51 and 52, and outputs the sheet on which an image has been formed to the sheet post-processor group 40.

The detector 36 detects the post-processor connected to the image forming apparatus 10.

The print controller 31 has a selector 34 and a calculator 35.

The calculator 35 calculates the waiting period for image processing that arises in the post-processing on this print job by the post-processor by comparing the processing speed of image processing in the print job in which image forming processing is to be done with the processing speed the processing speed of post-processing by the post-processor designated under this print job.

The selector 34 selects, according to the waiting period calculated by the calculator 35, a print job which gives rise to no waiting period out of the succeeding print jobs stored in the print job storage 32 and uses a post-processor different from the post-processor used by the print job which is to process image forming.

Then, the print controller 31 functions as an image forming controller to control the image forming part 33 so as to have the image forming processing of the print job selected by the selector 34 processed during the waiting period for image processing in the print job initially intended for image forming.

Incidentally, though the description regarding this exemplary embodiment presupposes that the selector 34 selects a print job out of succeeding print jobs stored in the print job storage 32 according to whether or not the waiting period calculated by the calculator 35 is 0, namely whether or not there is any waiting period, the invention is not confined to such a case. The selector 34 may as well select a print job for execution during the waiting period of the print job which is to process image forming according to whether or not the waiting period calculated by the calculator 35 is at least as long as a prescribed duration.

Figure 6A:
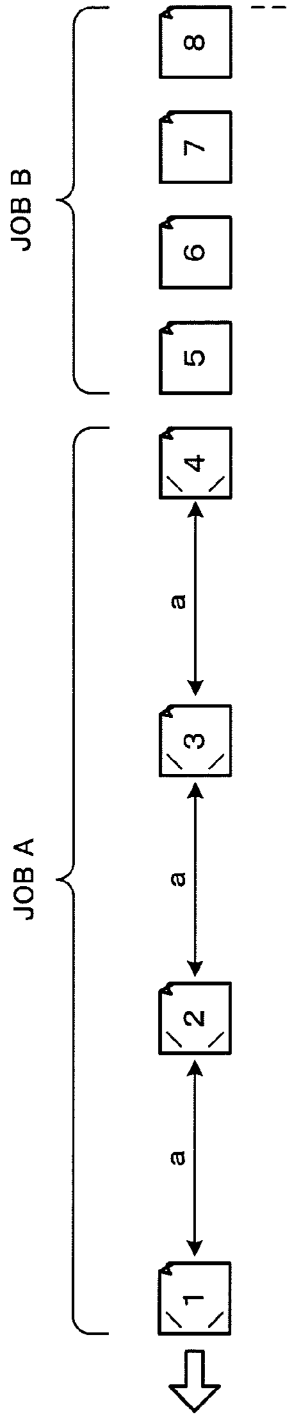
FIGS. 6A and 6B show examples of jobs to be executed by the image forming system of the first exemplary embodiment of the invention.

It is supposed that for instance, as shown in FIG. 6A, a job A which requires stapling and a job B which requires no particular post-processing but can be immediately delivered to the ejector after image forming processing have been sent from the terminal 30 to the image forming apparatus 10.

In such a case, if image forming for the job A and the job B is processed in the sequence in which these print jobs have been sent, stapling of each page for the job A will require reducing the processing speed of image forming by putting off paper feeding to the image forming apparatus 10 to match the processing speed of stapling. As a result, the whole length of time taken to process both the job A and the job B is extended.

Figure 6B:
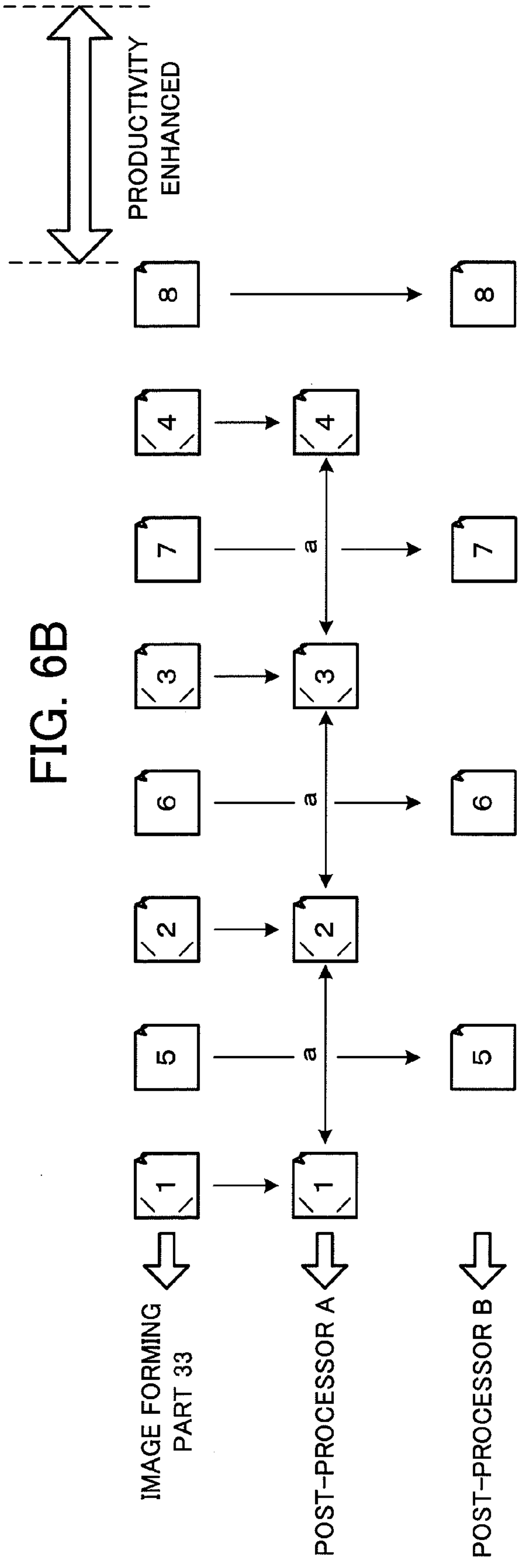

In the image forming apparatus 10 of this exemplary embodiment, when waiting for some time is required before image forming can be processed for the job A in this way, the time taken to complete processing for both the job A and the job B can be reduced by alternately processing page by page image forming for the job A and image forming for the job B as shown in FIG. 6B. In this case, it is obviously necessary for the post-processor A to which sheets of the job A are to be ejected and the post-processor B to which sheets of the job B are to be ejected to be different post-processors.

Incidentally, if the processing speed of each of the post-processors constituting the sheet post-processor group 40 is known in advance, the selector 34 may select, according to the type of the processor for the print job which is to process image forming, a print job which uses a different post-processor from that used for the print job which involves the processing of image forming out of the succeeding print jobs stored in the print job storage 32.

Figure 7:
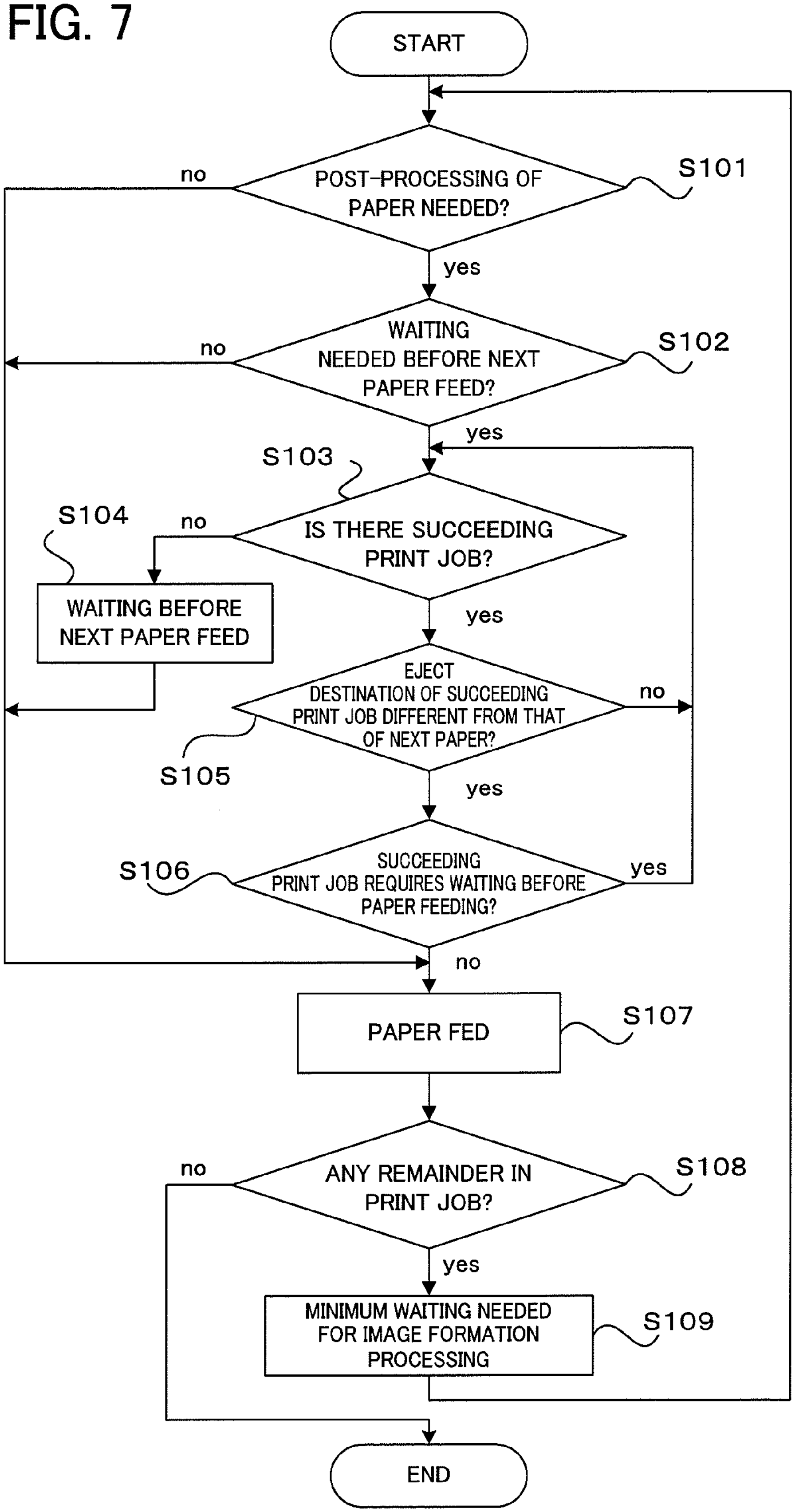
FIG. 7 is a flow chart showing processing of determination by the print controller 31 in the image forming apparatus 10 of the first exemplary embodiment of the invention.

Next, processing of determination by the print controller 31 in the image forming apparatus 10 of this exemplary embodiment will be described with reference to the flow chart of FIG. 7.

Incidentally, if waiting has to be processed by setting a waiting period because of the slower processing speed of post-processing than the processing speed of image forming in this exemplary embodiment, the print controller 31 realizes the processing of waiting by controlling the timing of paper sheet feeding to the image forming part 33.

First, the print controller 31 determines whether or not the print job to be executed first involves post-processing (step S101). If this print job involves post-processing, the print controller 31 determines whether or not waiting is needed before the next paper sheet feed in order to execute this post-processing (step S102). If it is determined that waiting is needed before the next sheet feed in order to execute the post-processing designated under the print job, it is determined whether or not there is any succeeding print job (step S103).

If it is determined at step S103 that there is no succeeding print job, the print controller 31, after a waiting period needed for post-processing (step S104), controls the image forming part 33 so as to cause paper sheets to be fed (step S107).

If it is determined at step S103 that there is any succeeding print job, the selector 34 of the print controller 31 determines whether or not the eject destination of the succeeding print job differs from that of the next paper sheet under the print job currently being processed (step S105).

If it is determined at step S105 that the eject destination of the succeeding print job differs from that of the next paper sheet under the print job currently being processed, the selector 34 determines whether or not the succeeding print job requires waiting before paper feeding (step S106). If it is determined at this step S105 that the succeeding print job requires no waiting before paper feeding, the selector 34 determines that this succeeding print job can be executed in parallel with the print job currently being processed, and the print controller 31 controls the image forming part 33 so as to cause paper sheets necessary for the execution of the succeeding print job to be fed (step S107).

If the print job next to the print job currently being processed fails to meet the conditions of steps S105 and S106, the further next print job is searched for (step S103), and similar processing is repeated.

Then the print controller 31 determines whether or not any unprocessed remainder is left in the print job (step S108), and if there is any remainder in the print job, after the minimum waiting needed for image forming (step S109), processing for the next page is repeated from step S101 onward.

Incidentally in this exemplary embodiment, if waiting before paper feeding becomes necessary at any page under print job currently being executed, a print job which permits paper sheet feeding without needing processing of waiting is selected out of print jobs differing in eject destination, and paper sheets are caused to be fed.

However, where different print jobs are to be executed in parallel, the printing mode may have to be switched over. Switch-over of the printing mode in this context means switch-over of the operating state of the image forming part 33 such as between the black and white printing mode and the full color printing mode. When this switching over the printing mode is to be accomplished, it becomes necessary to change the printing speed, the sheet size, the temperature and the speed of the fixing device, and picture quality adjustment necessitated by a change in paper quality. As such switch over of the printing mode requires a certain length of time, parallel execution of different print jobs may rather bring down the overall productivity of print processing.

In view of this risk, the selector 34 may select out of the succeeding print jobs a print job which, when executed in parallel with image forming under the currently executed print job, would not entail such switch-over of the operating state of image forming processing.

Figures 8A, 8B:
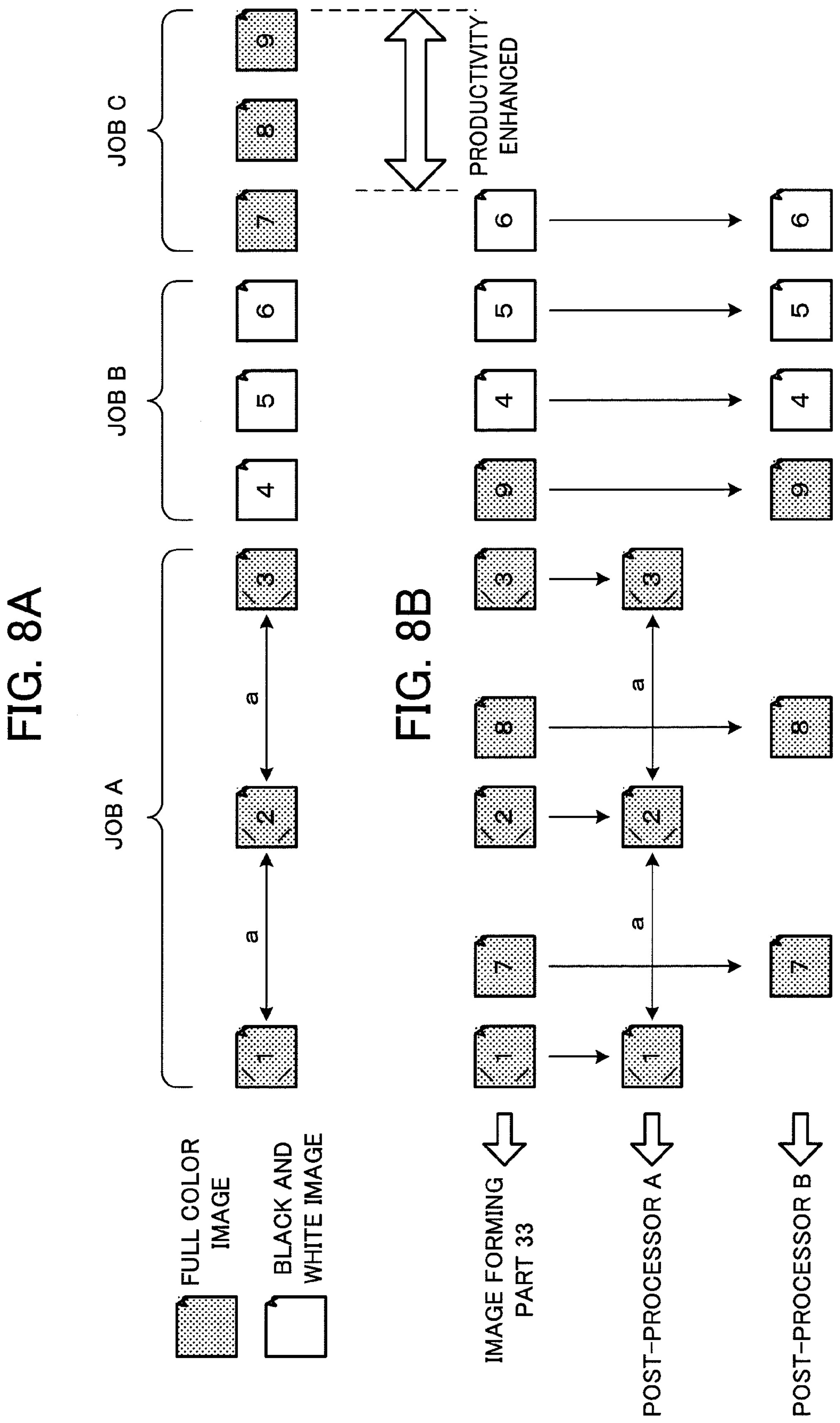
FIGS. 8A and 8B show other examples of jobs to be executed by the image forming system of the first exemplary embodiment of the invention.

A case in which three print jobs including the job A and the job B and a job C are stored in the print job storage 32 as shown in FIG. 8A for instance will be described. Each page in the jobs A and C is supposed to be composed of a full color image, while each page in the job B is supposed to be composed of a black and white image.

A case like what is shown in this FIG. 8A but in which the selector 34 has selected the job C as the print job to be executed in parallel with the job A is shown in FIG. 8B. Since both the job A and the job C are composed of full color images, even if the job A and the job C are executed in parallel, there is no need to switch over the printing mode between full color and black and white. In comparison, if it is attempted to execute the job A and the job B in parallel, the printing mode will have to be switched over between full color and black and white every time a page is printed, inviting deterioration in the total productivity of print processing.

Second Exemplary Embodiment

Next, an image forming system of a second exemplary embodiment of the present invention will be described.

In the first exemplary embodiment described above, where the print job currently being executed entails waiting, a print job which entails no waiting but permits immediate paper sheet feeding is selected and processed in parallel. For this reason, in the first exemplary embodiment, there is no possibility for a print job which entails waiting to be selected. Unlike that, the image forming system of the second exemplary embodiment of the invention permits selection of a print job which entails waiting if the waiting period is shorter than what the print job currently being executed necessitates.

The configuration of the image forming system of this exemplary embodiment differs from the image forming apparatus 10 of the first exemplary embodiment shown in FIG. 5 only in part of the method of print job selection by the selector 34, and accordingly its details will not be described.

The selector 34 in this exemplary embodiment, if the waiting period calculated by the calculator 35 is not shorter than 0, selects out of the succeeding print jobs a print job entailing a shorter waiting period in image forming processing.

Figures 9A, 9B:
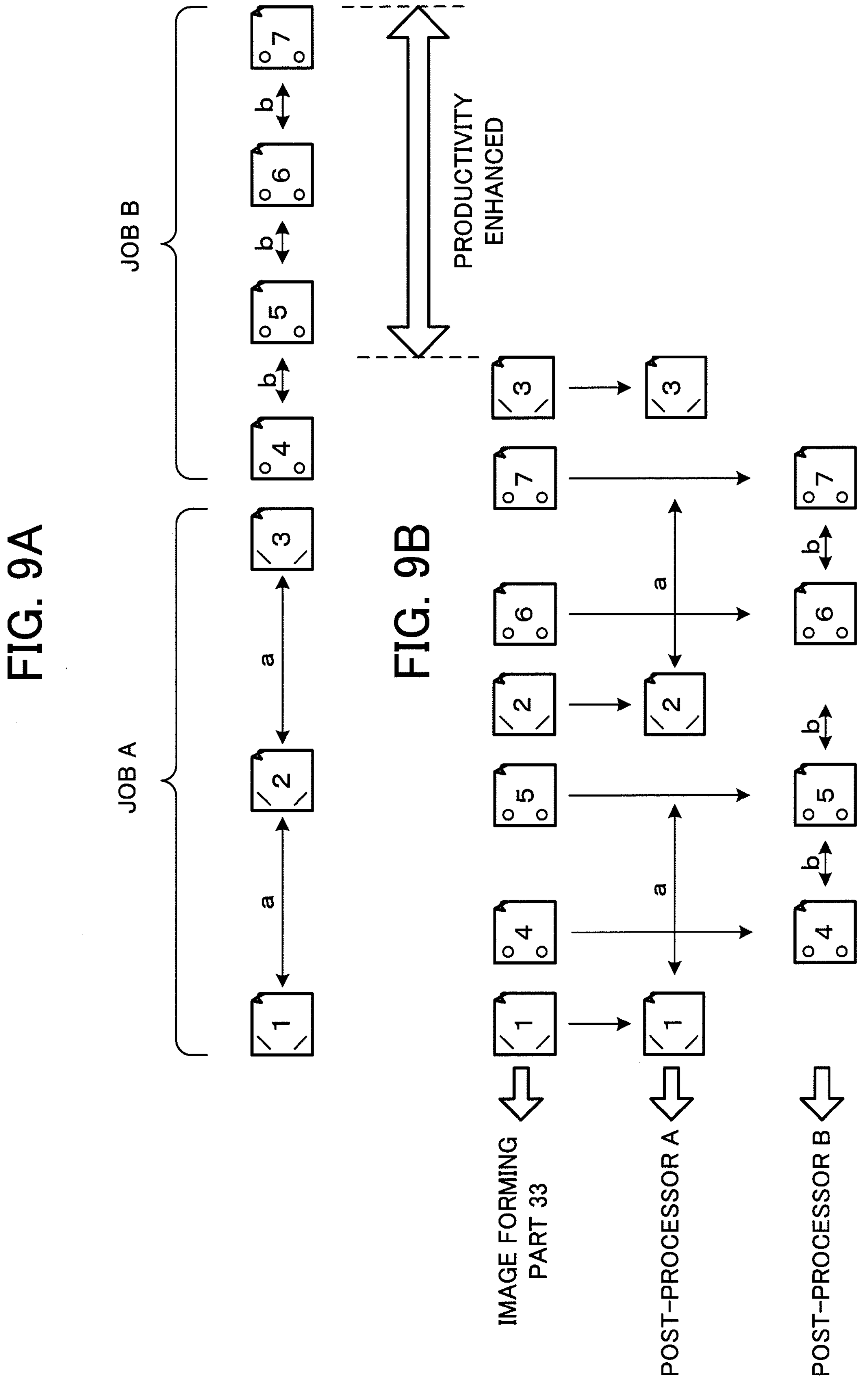
FIGS. 9A and 9B show examples of jobs to be executed by the image forming system of a second exemplary embodiment of the invention.

Thus, even if there are the job A requiring a waiting period a and the job B requiring a waiting period b as shown in FIG. 9, if the waiting period b is shorter than the waiting period a, image forming under the job B is processed during intervals of image forming under the job A.

Furthermore, if there is more than one succeeding print job, the selector 34 in this exemplary embodiment may select, out of the succeeding print jobs stored in the print job storage 32, the print job shortest in the waiting period which image forming entails.

Figure 10:
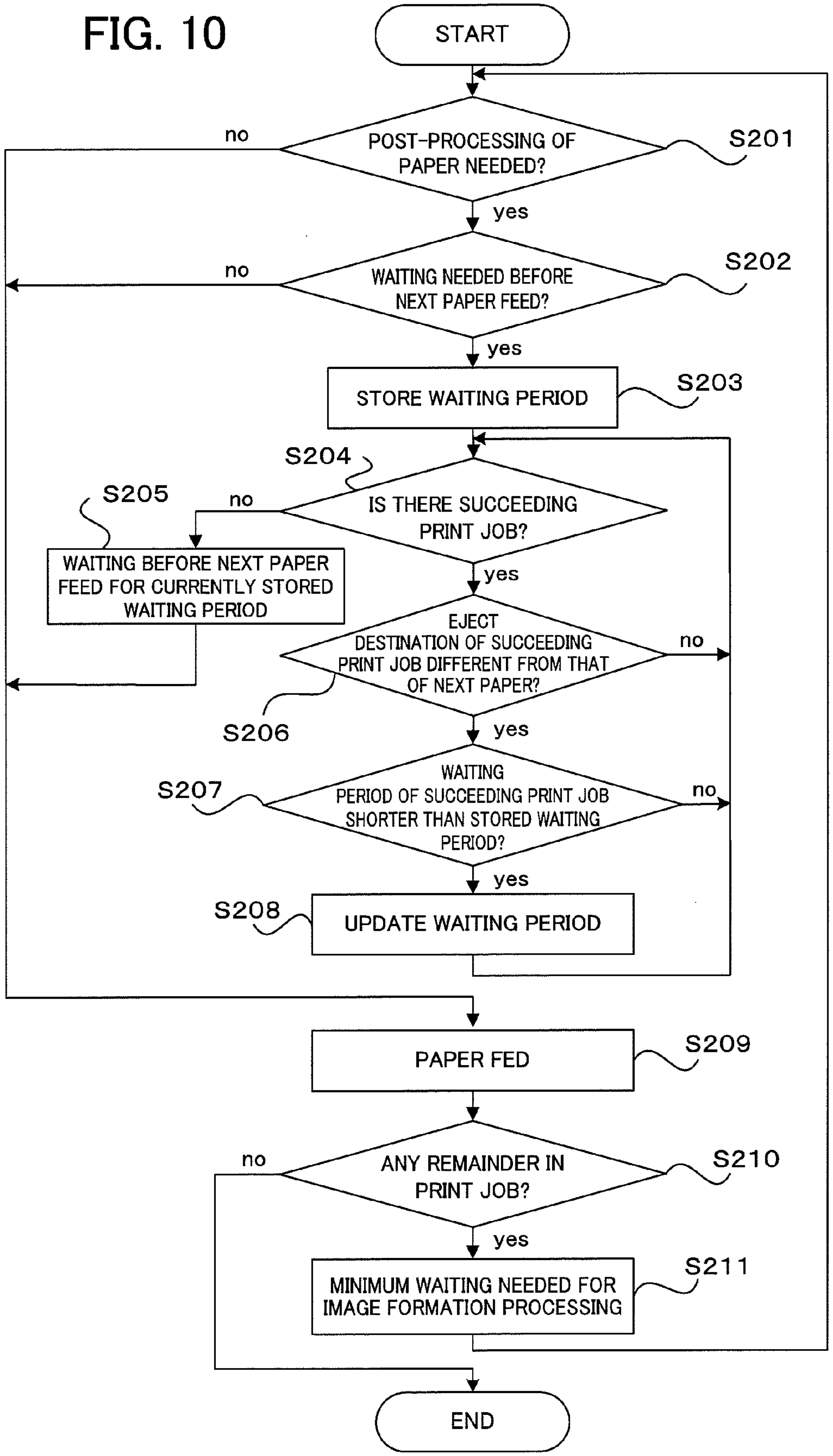
FIG. 10 is a flow chart showing processing of determination by the print controller 31 in the image forming apparatus 10 of the second exemplary embodiment of the invention.

Next, processing of determination by the print controller 31 in the image forming apparatus 10 of this exemplary embodiment will be described with reference to the flow chart of FIG. 10.

Incidentally, if waiting has to be processed by setting a waiting period because of the slower processing speed of post-processing than the processing speed of image forming in this exemplary embodiment, the print controller 31 realizes the processing of waiting by controlling the timing of paper sheet feeding to the image forming part 33.

First, the print controller 31 determines whether or not the print job to be executed first involves post-processing (step S201). If this print job involves post-processing, the print controller 31 determines whether or not waiting is needed before the next paper sheet feed in order to execute this post-processing (step S202). If it is determined that waiting is needed before the next sheet feed in order to execute the post-processing designated under the print job, the print controller 31 stores this waiting period (step S203). Then the print controller 31 determines whether or not there is any succeeding print job (step S204).

If it is determined at step S204 that there is no succeeding print job, the print controller 31, after waiting for paper sheet feeding for the period currently stored (step S205), controls the image forming part 33 so as to cause paper sheets to be fed (step S209).

If it is determined at step S204 that there is any succeeding print job, the selector 34 of the print controller 31 determines whether or not the eject destination of the succeeding print job differs from that of the next paper sheet under the print job currently being processed (step S206).

If it is determined at step S206 that the eject destination of the succeeding print job differs from that of the next paper sheet under the print job currently being processed, the selector 34 determines whether or not the waiting period of the succeeding print job is shorter than the waiting period that is stored (step S207). If it is determined at this step S207 that the waiting period of the succeeding print job is shorter than the waiting period that is stored, the print controller 31 updates the stored waiting period with this waiting period (step S208).

Then the processing from these steps S206 through S208 are repeated until there is no more succeeding print job (step S204) and, when all the succeeding print jobs have been processed, after waiting for paper sheet feeding for the period currently stored (step S205), the print controller 31 controls the image forming part 33 so as to cause paper sheets to be fed (step S209).

Then the print controller 31 determines whether or not any unprocessed remainder is left in the print job (step S210), and if there is any remainder in the print job, after the minimum waiting needed for image forming (step S S211), processing for the next page is repeated from step S201 onward.

MODIFICATIONS

Although the foregoing description of the exemplary embodiments refers to the application of the invention to image forming systems in which plural post-processors are connected to the image forming apparatus, the invention is not limited to such applications, and can be similarly applied to image forming apparatuses each having plural eject destinations which perform post-processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
- an image forming unit that forms an image on paper sheets;
- a plurality of post-processors that execute post-processing for paper sheets on which an image has been formed by the image forming unit;
- a calculator that calculates a waiting period for image forming that post-processing by a post-processor in response to a first print request entails;
- a selector that selects out of succeeding print requests a print request that requires the use of a different post-processor from the post-processor being used for the first print request as a second print request according to the waiting period calculated by the calculator; and
- an image forming controller that controls the image forming unit so as to execute image forming in response to the second print request selected by the selector in the waiting period for the image forming in response to the first print request.

2. The image forming system according to claim 1, wherein the selector selects as the second print request, out of succeeding print requests, a print request that entails no waiting period in image forming.

3. The image forming system according to claim 1, wherein the selector selects as the second print request, out of succeeding print requests, a print request involving a shorter waiting period arising in image forming than the waiting period arising in image forming under the first print request.

4. The image forming system according to claim 1, wherein the selector selects as the second print request, out of succeeding print requests, a print request involving the shortest waiting period arising in image forming.

5. The image forming system according to claim 1, wherein the selector selects as the second print request, out of succeeding print requests, a print request involving no switchover of the printing speed when executed in parallel with image forming under the first print request.

6. The image forming system according to claim 1, wherein the selector selects as the second print request, out of succeeding print requests, a print request involving no switchover of the paper sheet size when executed in parallel with image forming under the first print request.

7. The image forming system according to claim 1, wherein the selector selects as the second print request, out of succeeding print requests, a print request involving no switchover of the temperature of the fixing device when executed in parallel with image forming under the first print request.

8. The image forming system according to claim 1, wherein the selector selects as the second print request, out of succeeding print requests, a print request involving no switchover of the speed of the fixing device when executed in parallel with image forming under the first print request.

9. The image forming system according to claim 1, wherein the selector selects as the second print request, out of succeeding print requests, a print request involving no picture quality adjustment ensuing from a change in paper quality when executed in parallel with image forming under the first print request.

10. An image forming apparatus comprising:
- an image forming unit that forms an image on paper sheets;
- a detector that detects a connected post-processor;
- a calculator that calculates a waiting period for image forming that post-processing by a post-processor in response to a first print request entails;
- a selector that selects out of succeeding print requests a print request that requires the use of a different post-processor from the post-processor being used for the first print request as a second print request according to the waiting period calculated by the calculator; and
- an image forming controller that controls the image forming unit so as to execute image forming in response to the second print request selected by the selector in the waiting period in response to the first print request.

11. A non-transitory computer readable medium storing a program causing a computer to execute a process comprising:
- calculating a waiting period for image forming that post-processing by a post-processor in response to a first print request entails;
- selecting out of succeeding print requests a print request that requires the use of a different post-processor from the post-processor being used for the first print request as a second print request according to the calculated waiting period; and
- executing image forming in response to the selected second print request in the waiting period in response to the first print request.

12. An image forming method comprising:
- calculating a waiting period for image forming that post-processing by a post-processor in response to a first print request entails;
- selecting out of succeeding print requests a print request that requires the use of a different post-processor from the post-processor being used for the first print request as a second print request according to the calculated waiting period; and
- executing image forming in response to the selected second print request in the waiting period in response to the first print request.

* * * * *